(12) United States Patent
Brogardh

(10) Patent No.: US 8,099,188 B2
(45) Date of Patent: Jan. 17, 2012

(54) PARALLEL KINEMATIC ROBOT AND METHOD FOR CONTROLLING THIS ROBOT

(75) Inventor: Torgny Brogardh, Västerås (SE)

(73) Assignee: ABB AB, Västerås (SE)

( * ) Notice: Subject to any disclaimer, the term of this patent is extended or adjusted under 35 U.S.C. 154(b) by 1174 days.

(21) Appl. No.: 11/629,190

(22) PCT Filed: Jun. 3, 2005

(86) PCT No.: PCT/EP2005/052571
§ 371 (c)(1),
(2), (4) Date: Jun. 28, 2007

(87) PCT Pub. No.: WO2005/120780
PCT Pub. Date: Dec. 22, 2005

(65) Prior Publication Data
US 2007/0255453 A1   Nov. 1, 2007

Related U.S. Application Data

(60) Provisional application No. 60/578,322, filed on Jun. 10, 2004.

(51) Int. Cl.
*G06F 19/00* (2011.01)
(52) U.S. Cl. .................. 700/245; 700/254; 700/262
(58) Field of Classification Search .............. 700/245, 700/254, 262; 901/2, 14, 19, 27; 74/490.01; 414/680, 699, 730
See application file for complete search history.

(56) References Cited

U.S. PATENT DOCUMENTS

| | | | | | |
|---|---|---|---|---|---|
| 5,053,687 | A | * | 10/1991 | Merlet ..................... 318/568.2 |
| 5,354,158 | A | * | 10/1994 | Sheldon et al. .............. 409/201 |
| 5,539,291 | A | * | 7/1996 | Reboulet ................. 318/568.11 |
| 6,330,837 | B1 | * | 12/2001 | Charles et al. ............. 74/490.06 |
| 6,974,297 | B2 | * | 12/2005 | Brogårdh ...................... 414/680 |
| 2002/0150449 | A1 | * | 10/2002 | Nelson et al. ................ 414/217.1 |
| 2003/0005786 | A1 | * | 1/2003 | Stuart et al. ................. 74/479.01 |
| 2003/0204965 | A1 | * | 11/2003 | Hennessey ...................... 33/645 |
| 2004/0028516 | A1 | * | 2/2004 | Brogardh ...................... 414/735 |
| 2004/0052628 | A1 | | 3/2004 | Thurneysen et al. |
| 2005/0172750 | A1 | * | 8/2005 | Kock et al. ................. 74/490.01 |
| 2006/0104793 | A1 | * | 5/2006 | Skutberg et al. ........... 414/744.6 |
| 2008/0294285 | A1 | * | 11/2008 | Shoham ........................ 700/245 |

FOREIGN PATENT DOCUMENTS

| | | |
|---|---|---|
| EP | 1234632 A1 | 8/2002 |
| WO | WO-02/34480 A1 | 5/2002 |
| WO | WO 03/059581 A1 * | 7/2003 |
| WO | WO-2004/056538 A1 | 7/2004 |
| WO | WO2004/056538 A1 * | 7/2004 |

\* cited by examiner

*Primary Examiner* — Khoi Tran
*Assistant Examiner* — Jorge Peche
(74) *Attorney, Agent, or Firm* — Venable LLP; Jeffri A. Kaminski; Eric J. Franklin

(57) ABSTRACT

An industrial robot for moving an object in space. A platform is arranged for carrying the object. A first arm is arranged for influencing the platform in a first movement. The first arm includes a first actuator and three links. Each link includes an outer joint connected to the platform and an inner joint connected to the first actuator. A second arm is arranged for influencing the platform in a second movement. The second arm includes a second actuator and two links. Each link includes an outer joint connected to the platform and an inner joint connected to the second actuator. A third arm is arranged for influencing the platform in a third movement. The third arm includes one link including an outer joint connected to the platform. At least one of the links is arranged with an adjustable length and includes a linear actuator for controlling the length of the link.

17 Claims, 17 Drawing Sheets

US 8,099,188 B2

PARALLEL KINEMATIC ROBOT AND METHOD FOR CONTROLLING THIS ROBOT

CROSS-REFERENCE TO RELATED APPLICATIONS

This application claims priority to U.S. provisional patent application 60/578,322 filed 10 Jun. 2004 and is the national phase under 35 U.S.C. §371 of PCT/EP2005/052571.

FIELD OF THE INVENTION

The present invention relates to an industrial robot for moving an object in space. The object is for example a tool or a work object. Such a robot comprises a manipulator and control equipment for moving the object. The manipulator comprises a parallel kinematic manipulator including at least three arms, each comprising a link arrangement. The manipulator comprises a platform jointly supported by the three arms. Each arm is associated with an actuator with the purpose of moving the links of the arm such that a movement of the platform is attained. The task of the platform is to directly or indirectly support tools or work objects, large as well as small, for movement, measurement, processing, working, joining, etc. In particular, the manipulator is intended to be used in the manufacturing industry, but also transfer of goods and passageways for passengers in harbours and airports may come into question.

PRIOR ART

An industrial robot includes a manipulator and a control unit having means for automatically operating the manipulator. There are different types of manipulators, such as a serial kinematic manipulator and a parallel kinematic manipulator. A parallel kinematic manipulator (PKM) is defined as a manipulator comprising at least one stationary element, a movable element, denoted a platform, and at least two arms. Each arm comprises a link arrangement connected to the movable platform. Each arm is actuated by a driving means preferably arranged on the stationary element to reduce the moving mass. These link arrangements transfer forces to the movable platform. For a fully built-up parallel kinematic manipulator for movement of the platform with three degrees of freedom, e.g. in directions x, y and z in a Cartesian system of coordinates, three parallel-working arms are required. To obtain a stiff arm system with a large loading capacity and a low weight, the arms of the parallel kinematic manipulator should have a total of six links. This means that the arms must share the six links between them, and this can only be done with certain combinations.

When a rectangular workspace is required in manipulator applications, so-called gantry manipulators are used today. These manipulate a platform with normally three degrees of freedom: x, y, z. These manipulators are composed of three series-connected linear paths, on which movable units are moved in the x-, y- and z-directions.

The international patent application WO02/34480 discloses an industrial robot of gantry type comprising a platform arranged for carrying an object, a first arm arranged for influencing the platform in a first movement and comprising a first actuator having a first path and a first carriage linearly movable along the first path, and at least two links, each of which comprises an outer joint arranged in the platform and an inner joint arranged in the first carriage, a second arm arranged for influencing the platform in a second movement and comprising a second actuator, having a second path and a second carriage linearly movable along the second path, and two links, each of which comprises an outer joint arranged in the platform and an inner joint arranged in the second carriage, and a third arm arranged for influencing the platform in a third movement and comprising a third actuator and at least one link, which comprises an outer joint arranged in the platform and an inner joint connected to the third actuator. The arm supports an axis of rotation when the manipulator has four degrees of freedom. In this document a robot is disclosed for which the arms share the six links between them in a combinations 3/2/1.

OBJECTS AND SUMMARY OF THE INVENTION

The object of the present invention is to provide an improved industrial robot comprising a parallel kinematic manipulator.

At least one of the links is arranged with an adjustable length and includes a linear actuator for controlling the length of the link. The linear actuator for controlling the length of the link is adapted to change the axial length of the link based on a control signal from the control unit of the robot. For example, the linear actuator is used for controlling the movement of the platform in the x, y or z-direction, or for modulating the tilt angle of the platform and thereby increasing the number of degrees of freedom of the robot. Having a linear actuator controlling the length of the link integrated in the link is particularly useful in application when high stiffness is more important than high speed and acceleration. Examples of such robot applications are drilling, cutting, milling and grinding in hard materials such as steel and iron.

If one of the links of the manipulator is replaced with a link with an adjustable length many possibilities for increasing the stiffness of the manipulator are provided. For example, if the degrees of freedom exceed the desired number, the extra degree of freedom obtained can be used for increasing the stiffness of the robot by controlling the robot configuration. i.e. the configuration of the link structure. The ambition is to try to optimize the configuration of the link structure in order to achieve highest possible stiffness. For example, the link is momentarily adjusted in order to increase the stiffness of the link structure.

One possibility obtained for increasing the stiffness of the manipulator is to measure the stress in the path caused by tool forces. These stress values are used to calculate the bending torque on the linear path and the added axial forces in the link. By means of an elastokinetic model of the linear path and the link, the adjustment necessary on the link length is calculated in order to compensate for the TPC (Tool Center Pont) errors caused by the elasticity of the robot structure. The link length is adjusted based on the calculated adjustment. Thereby, it is possible to compensate not only for low frequency force changes, but also for phenomena as chattering during milling or wobbling during drilling.

According to one embodiment of the invention the link of the third arm is arranged with an adjustable length and includes the linear actuator for controlling the length of the link. Providing the link of the third arm with an actuator for controlling the length of the link makes it possible to control the inclination of the link in order to maximize the stiffness of the robot with respect to tool forces. When the inclination is changed the length of the link is adjusted dependent on the distance between outer joint connected to the platform and the inner joint connected to the actuator moving the link. To achieve highest possible stiffness the angle between the link and the linear path should preferable be about 90°, and the angle between the link of the third arm and the links of the other arms should preferable be about 90°. Thus, this embodiment makes it possible to control the movements of the link of the third arm in such way that the angle between the link and the linear path is close to 90°, and/or the angle between the link of the third arm and one or more of the other links is close to 90°.

According to one embodiment of the invention at least one of the first and second actuators comprises a linear path and a carriage linearly movable along the path and the link of the third arm comprises an inner joint connected to the carriage. In this embodiment the linear actuator is used for controlling the movement of the platform mainly in the z-direction. This embodiment can be combined with a large distance between upper and lower links of the first and/or second arms, which reduces the forces on these links caused by tool forces and thereby improving the stiffness of the manipulator. Another advantage with this embodiment is that it does not require three linear paths, which makes the robot cheaper and less bulky. For very long objects like wing components or wind power blades, it is a disadvantage to have three or even two parallel linear paths along the whole length of the object, because of the cost of linear actuators. A more cost effective solution is to use two paths or only one path covering the length of the object and instead use a linear actuator carried by the path. The linear actuator controls the movement of the platform by adjusting the length of the link of the third arm.

According to one embodiment of the invention the first actuator comprises a first path and a first carriage linearly movable along the first path, and said inner joints of said three links are connected to the first carriage, said second actuator comprises a second path and a second carriage linearly movable along the second path, and said inner joints of said two links are connected to the second carriage, and the second path is mounted on the first carriage, and said link of the third arm comprises an inner joint connected to the second carriage. This embodiment only requires one path covering the length of the object, and thus is particularly useful for applications including processing of very long objects.

According to one embodiment of the invention the first actuator comprises a first path and a first carriage linearly movable along the first path, and said inner joints of said three links are connected to the first carriage, said second actuator comprises a second path and a second carriage linearly movable along the second path, and said inner joints of said two links are connected to the second carriage, and said third arm comprises a third actuator having a third path and a third carriage linearly movable along the third path, and said link of the third arm comprises an inner joint connected to the third carriage. In this embodiment the linear actuator controlling the length of the link controls the movement of the platform mainly in the z-direction and a third actuator linearly movable along a third path controls the inclination of the link in order to improve the stiffness of the manipulator. Thus, the third arm is redundant which means that there are more actuators than the number of manipulated degrees of freedom of the moving platform. This redundancy is utilized for increasing the stiffness of the manipulator.

According to one embodiment of the invention the manipulator includes at least two links arranged with an adjustable length and includes a linear actuator for controlling the length of the link. Thereby it is possible to increase the stiffness of the manipulator as well as to change the orientation of the platform. For example, one of the two links arranged with an adjustable length is the link of the third arm. To obtain tilting of the platform in one degree of freedom, for example one of the links of the second arm, or one of the links of the first arm, is arranged with an adjustable length. To obtain tilting of the platform in two degrees of freedom, for example one of the links of the second arm and one of the links of the first arm is arranged with an adjustable length. To obtain tilting of the platform in three degrees of freedom, for example one of the links of the second arm, and two of the links of the first arm, is arranged with an adjustable length.

According to one embodiment of the invention at least one of said three links of the first arm is arranged with an adjustable length and includes a linear actuator for controlling the length of the link. In this embodiment the linear actuator is used for controlling the tilt angle of the platform. An advantage with this embodiment is that it makes it possible to manipulate the orientation of the platform without loosing stiffness. An alternative would be to mount a serial kinematic wrist assembly on the platform to rotate and/or tilt the tool or work object mounted on the platform. However, suck a serial wrist will be heavy and have a low stiffness. On the other hand using an actuator for controlling the length of the link will not add weight to the platform and are easy to design with high stiffness.

According to one embodiment of the invention at least one of said two links of the second arm is arranged with an adjustable length and includes a linear actuator for controlling the length of the link. In this embodiment the linear actuator is used for controlling the tilt angle of the platform.

A method is proposed for controlling an industrial robot wherein the third arm comprises a path and a carriage linearly movable along the path and one link comprising an outerjoint connected to the platform and an inner joint connected to the third carriage, and the link of the third arm is arranged with an adjustable length and includes a linear actuator for controlling the length of the link. The linear actuator of the single link of the third arm provides an extra degree of freedom and can be used for increasing the stiffness of the robot by controlling the robot configuration. The method comprises controlling the movement of the carriage of the third arm along the path thereby controlling the inclination of the link of the third arm in order to increase the stiffness of the robot with respect to tool forces, and adjusting the length of the link of the third arm based on the position of the third carriage and the desired position of the platform. Thereby the stiffness of the robot is increased.

According to one embodiment of the invention the method comprises determining the angle between the link of the third arm and at least one of the other links of the robot, and on basis thereof controlling the movement of third carriage along the third path in order to obtain a desired angle, which is favorable with regard to the stiffness of the robot, between the link of the third arm and the other link. Preferably, the movement of the third carriage is controlled such that the angle between the link of the third arm and the other links becomes as close as possible to 90°. Thereby, the stiffness of the manipulator is increased.

According to one embodiment of the invention the method comprises determining the angle between the link of the third arm and the third path, and on basis thereof controlling the movement of third carriage along the third path in order to obtain a desired angle, which is favorable with regard to the stiffness of the robot, between the link of the third arm and the third path. Preferably, the desired angel between the link of the third arm and the third path becomes as close as possible to 90°. Thereby, the stiffness of the manipulator is increased.

According to a further aspect of the invention, the object is achieved by a computer program directly loadable into the internal memory of a computer or a processor, comprising software code portions for performing the steps of the method according to the invention, when said program is run on a computer. The computer program is provided either on a computer readable medium or through a network, such as the Internet.

According to another aspect of the invention, the object is achieved by a computer readable medium having a program recorded thereon, when the program is to make a computer perform the steps of the method according to the invention, and said program is run on the computer.

According to another aspect of the invention, the object is achieved by means of an industrial robot. Instead of integrating the linear actuator with the link, a linear actuator is mounted on one of the first and second carriage to linearly move the outer joint of the link in relation to the carriages. The linear actuator actuates the platform by moving the outer joint of the link, instead of changing the length of the link, as in the previous mentioned embodiments of the invention. The advantage of this robot is that the linear actuator does not add any inertia to the link structure and are therefore useful in applications requiring high speed and acceleration, for example milling, drilling and deburring in rather soft materials such as aluminum, plastics and wood. This solution is particularly useful for applications when high speed and acceleration are more important than the stiffness of the manipulator.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
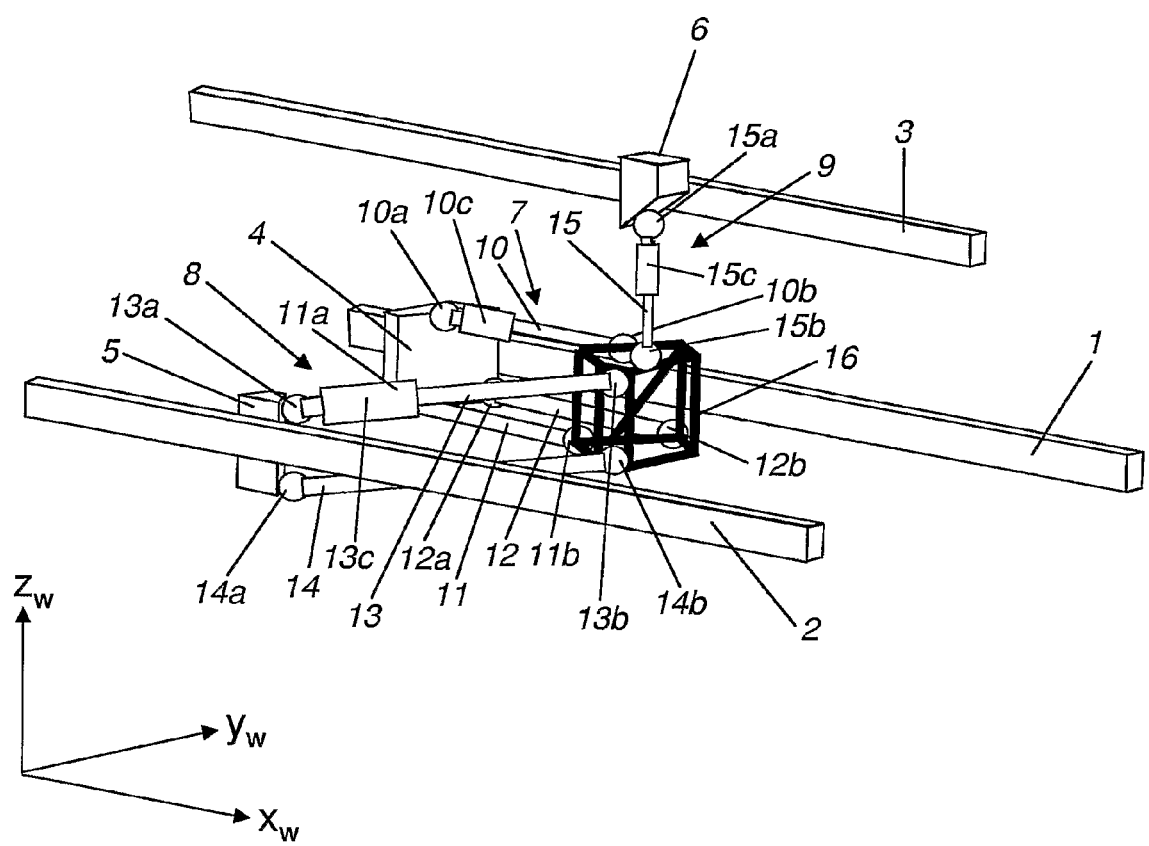
FIG. 1 shows an embodiment example of an industrial robot having a link with a linear actuator for changing the length of the link.

FIG. 1 shows a parallel kinematic manipulator (PKM) according to a first embodiment of the invention. The manipulator comprises two linear paths 1 and 2, which together define a plane parallel to the $x_w y_w$-plane of the world coordinate system shown in the figure. On path 1 there is a carriage 4, which is actuated to move along path 1 by for example a motor-driven ball screw linear module, a motor-driven band transmission, a rack- and pinion drive, a direct-driven linear motor, a pneumatic cylinder, or a hydraulic cylinder. In the same way a carriage 5 is actuated along the path 2. The manipulator further comprises a linear path 3 and a carriage 6 actuated to move along path 3. The path 3 is parallel with the paths 1 and 2 and forms a triangular geometry in the $y_w z_w$-plane together with the paths 1 and 2.

The robot further includes a platform 16 for carrying an object. The object is for example a tool. Each carriage 4, 5 and 6 is connected to the platform 16 by means of an arm, the carriage 4 with a first arm 7, the carriage 5 with a second arm 8, and the carriage 6 with a third arm 9. The first arm 7 comprises three parallel links 10, 11, 12. At each end of the links there is a joint. Thus, the link 10 has an inner joint 10a and an outer joint 10b, the link 11 has an inner joint 11a and an outer joint 11b, and the link 12 has an inner joint 12a and an outer joint 12b. The arm 8 comprises two parallel links 13 and 14 and in the same way as for the arm 7 these links have an inner and an outer joint, 13a and 13b for link 13, and 14a and 14b for link 14. Finally, the arm 9 has only one link 15 with an inner joint 15a and an outer joint 15b. The joints 13a, 13b, 14a, 14b, 15a, 15b must have at least 2 degrees of freedom, in the following denoted DOF.

The carriage 4 on the path 1 carries the parallel links 10, 11 and 12 and these links are mounted on the carriage by means of the joints 10a, 11a and 12a. In the other ends the links are mounted on the moving platform 16 with the joints 10b, 11b and 12b, all with at least 2 DOF. Carriage 5 on path 2 is connected to the links 13 and 14 with the joints 13a and 14a, and at the other end of the links a connection is made to the moving platform 16 with the joints 13b and 14b. Finally, carriage 6 on the path 3 is connected to the link 15 with the joint 15a and the link 15 is connected to the moving platform with the joint 15b. All joints must have at least 2 DOF, but to have a not redundant mechanical system at least one joint in one end of each link should have three DOF.

As shown in FIG. 1 three linear actuators 10c, 13c and 15c are integrated in the link structure of the manipulator. The linear actuators are implemented with for example a ball screw, rack and pinion or band transmission. Each of the links 10, 13 and 15 are equipped with linear actuators 10c, 13c and 15c for controlling the length of the link. These will apply forces in the axial direction of the links and will modulate the distance between the joints at each end of the link. This actuation will change the position and orientation of the moving platform 16. Thus, the linear actuator 15c will move the platform up and down and the linear actuators 10c and 13c will change the tilt angle of the platform. If a linear actuator is also introduced for the link 11, it will also be possible to rotate the moving platform around the Zw axis of the world coordinate system shown in the figure.

The robot according to the invention comprises a control unit (not shown) having memory, one or more processors and other equipment necessary for controlling the motion of the robot. The control unit comprises software for carrying out the steps of the method according to the invention.

In another embodiment of the invention, the actuators 10c and 13c are removed, and the manipulator only comprises the linear actuator 15c.

Figure 2A:
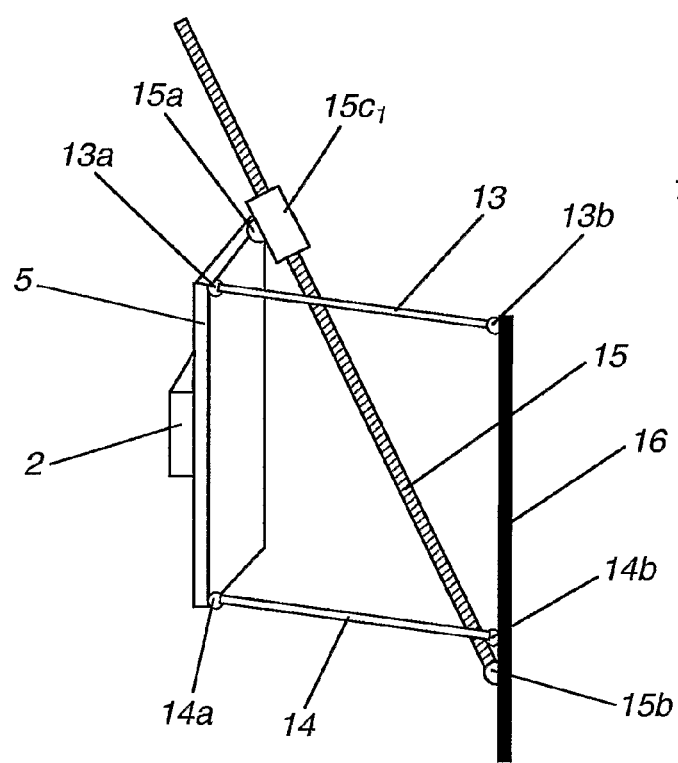
FIGS. 2a-b show two examples of linear actuators for changing the length of the link.
Figure 2B:
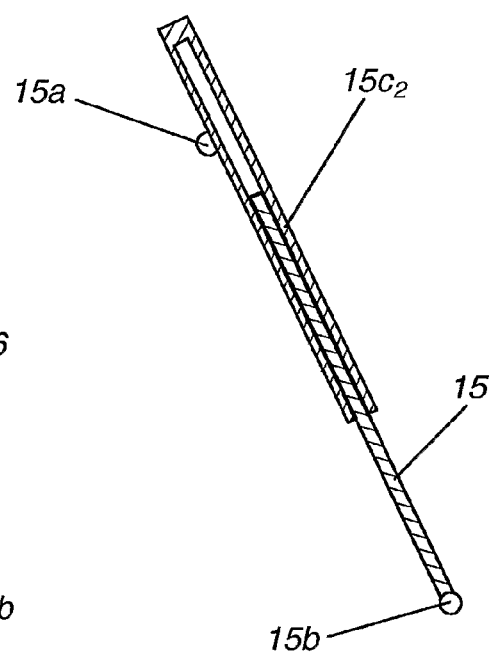

The linear actuators that are integrated into the links to change link lengths can be made in different ways. FIGS. 2a-b show two possibilities. In FIG. 2a the actuator 15c comprises a motor $15c_1$, having a hollow rotor shaft, through which the link 15 can pass. The link length is controlled by the motor $15c_1$. By means of a ball-screw concept the rotation of the rotor of the motor will force the link 15 to move through the rotor and the distance between the joints 15a and 15b will be changed. The link 15 itself is a screw in this case, and the ball chains are located inside the hollow rotor shaft. The advantage with this design is that the working range for the control of the distance between the joints 15a and 15b is very large. However, the joints 15a and 15b must be able to handle the twisting torques generated by the ball-screw and have to be designed stiffer than the rest of the joints in the robot. One way to get rid of this is to use a sliding mechanism as shown in FIG. 2b with linear bearings to handle the twisting torque generated by the ball-screw mechanism. In FIG. 2b the actuator $15c_2$ comprises both the ball part of the ball-screw mechanism, and linear bearings to prevent the screw from rotating around its own axis. If instead of a ball-screw mechanism a pneumatic or hydraulic actuator is used, no twisting torques are generated on link 15 and no linear bearings along the length of 15 is needed. Of course, other mechanisms can be used to change the distance between the joints 15a and 15c as for example a link connected to a band transmission or a direct drive linear motor. For micro-manipulation also a piezo-electric linear actuator can be used.

Figure 3:
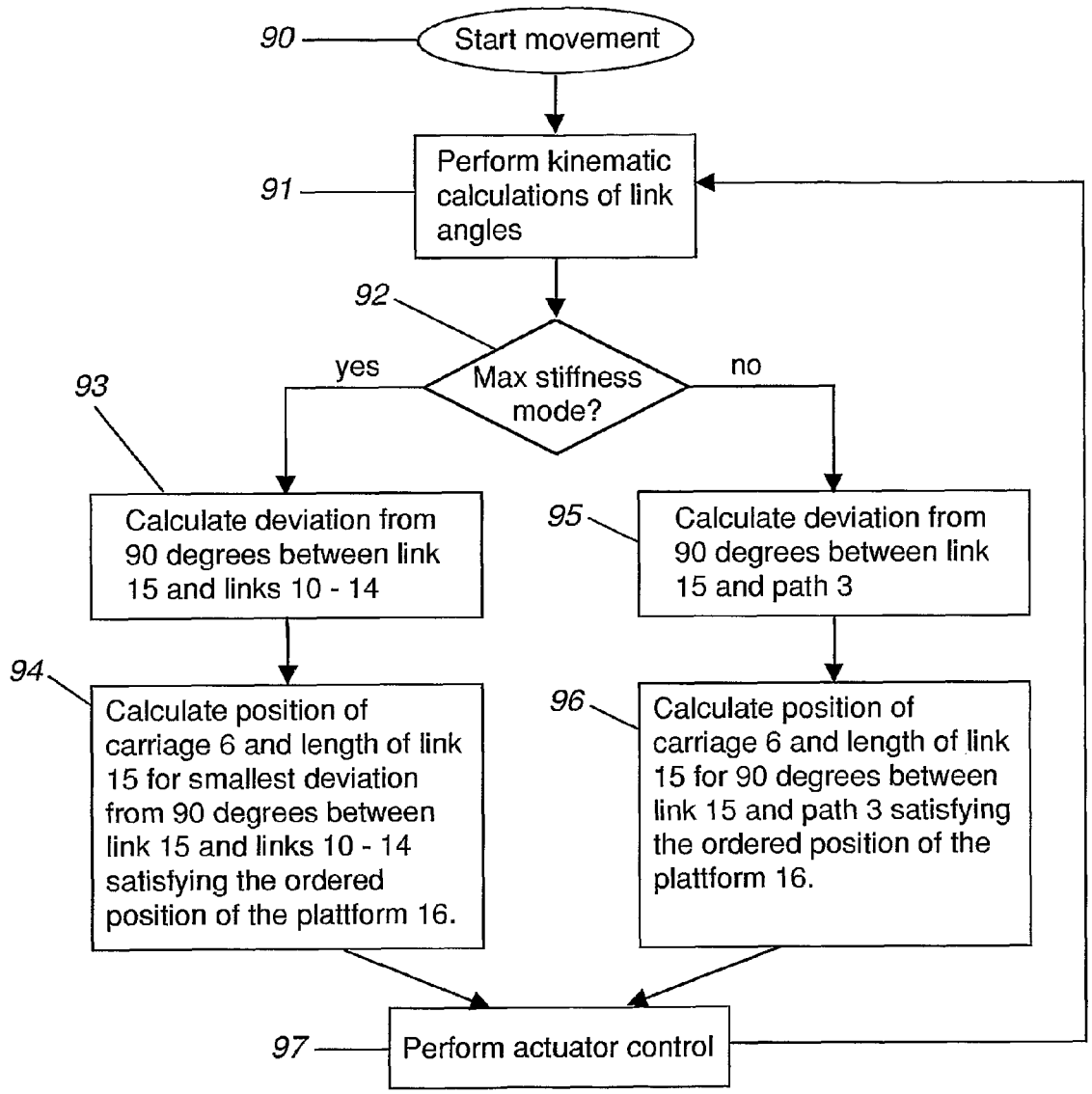
FIG. 3 illustrates an example of a method for controlling the robot configuration in order to increase the stiffness of the robot.

FIG. 3 is a flow chart illustration of a method and a computer program product according to an embodiment of the present invention. It will be understood that each block of the flow chart can be implemented by computer program instructions. The method is described with reference to the manipulator disclosed in FIG. 1. FIG. 3 shows the implementation of the method used to handle the redundancy of a linear link actuator when the stiffness of the robot is increased by controlling the robot configuration. Thus, when a movement of the manipulator has started, block 90, a kinematic calculation is made not only to calculate the desired actuator positions to obtain the ordered moving platform position, but also to calculate the angles between the links of the robot, block 91. The robot can either be designed for maximum stiffness mode, or for minimum torque mode, block 92.

In the maximum stiffness mode the deviation from 90 degrees of the angle between the link 15 and the rest of the links 10-14 is calculated, block 93, and if the absolute value of this deviation is larger than zero, the position of the carriage 6 and the link length of link 15 are calculated to give as small value as possible for the deviation from 90 degrees, given constraints on the working ranges of actuated carriage 6, actuator 15c, and on the dynamics of the movements of these actuator units, block 94. These values for carriage 6 and actuator 15c are then used as position references for the control of the next incremental movement of the robot, block 97. For the next movement increment the procedure is repeated from 91, and it should be observed that now the old values on minimum link angle deviations from 90 degrees can be used as a starting point when the position of the carriage 6 and the length of the link 15 are calculated.

If instead the strategy for minimum torque of the actuation of the carriage 6 is used, the same type of calculations are made for the angle between link 15 and the path 3, block 95 and 96. If this angle is kept at zero degrees the actuation of the carriage 6 will only need to have enough power to take care of the linear bearing friction between carriage 6 and the path 3.

Figure 4:
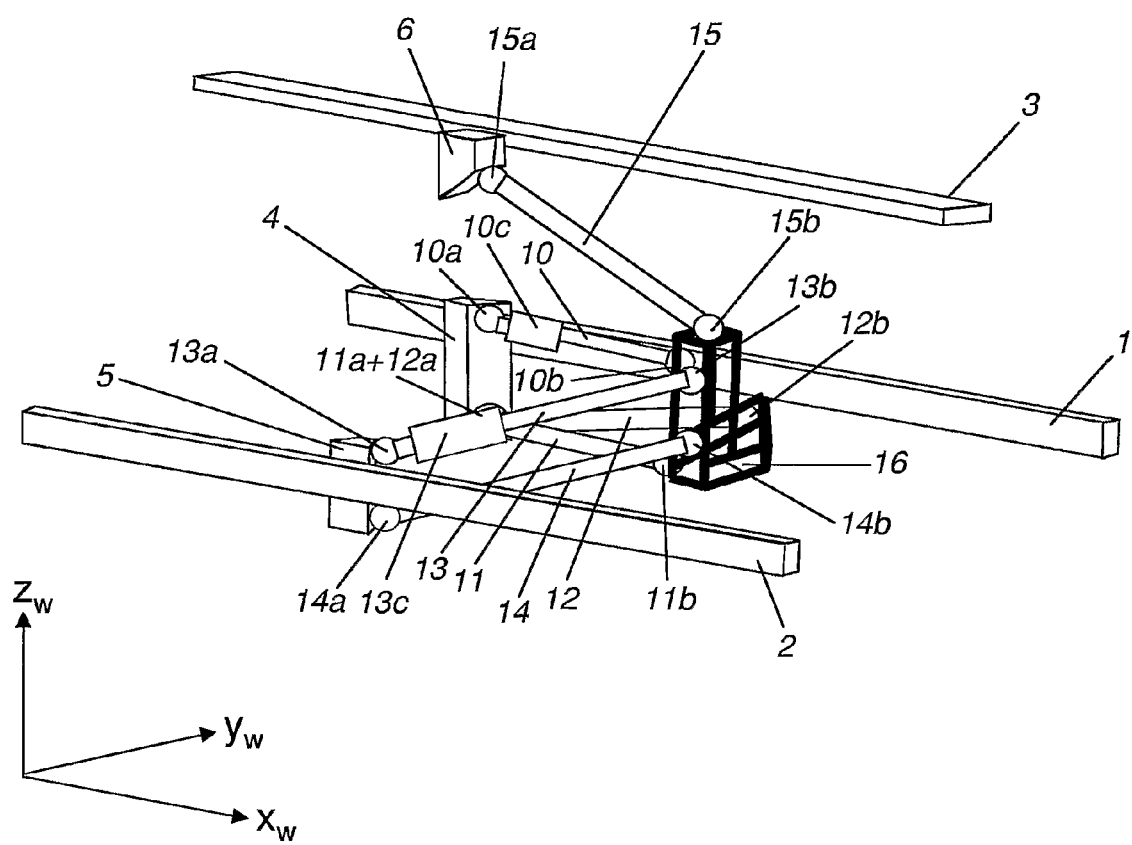
FIGS. 4-9 show further embodiment examples of an industrial robot having a link with a linear actuator for changing the length of the link.

FIG. 4 shows how the linear actuators 10c and 13c also can be used in a robot where the links 11 and 12 are connected to a common joint 11a+12a on the carriage 4. The advantage with this joint arrangement is that the whole robot structure can be reconfigured to work in the opposite direction, which will increase the workspace with a given length of the linear paths. As in FIG. 1 the actuators 10c and 13c will control the tilt angle of the moving platform 16.

Figure 5:
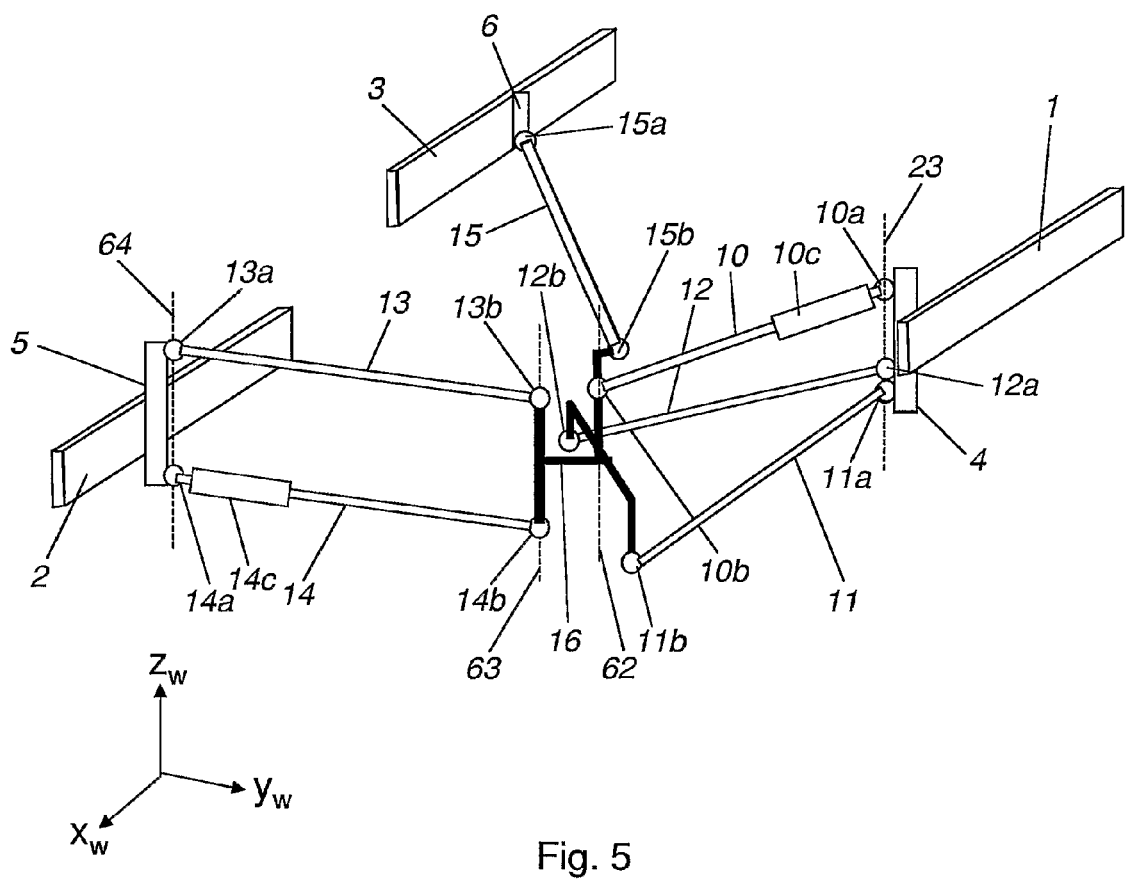

In FIG. 5 the link structure of FIG. 2 is easier to understand and moreover the joints 11a and 12a are separated in the Zw-direction to obtain a not redundant assembly of the link structure. Another difference in relation to FIG. 2 is that the linear actuator 13c in link 13 is replaced by a linear actuator 14c in link 14. However, the functionality is the same, the linear actuators 10c and 14c are used to modulate the tilt angle of the moving platform 16. The moving platform is drawn as a kinematic structure and it is an advantage to have the lines 23, 62, 63 and 64 in parallel when the structure is assembled and the actuators 10c and 14c are in the middle of their working range in order to have largest possible work space.

Figure 6:
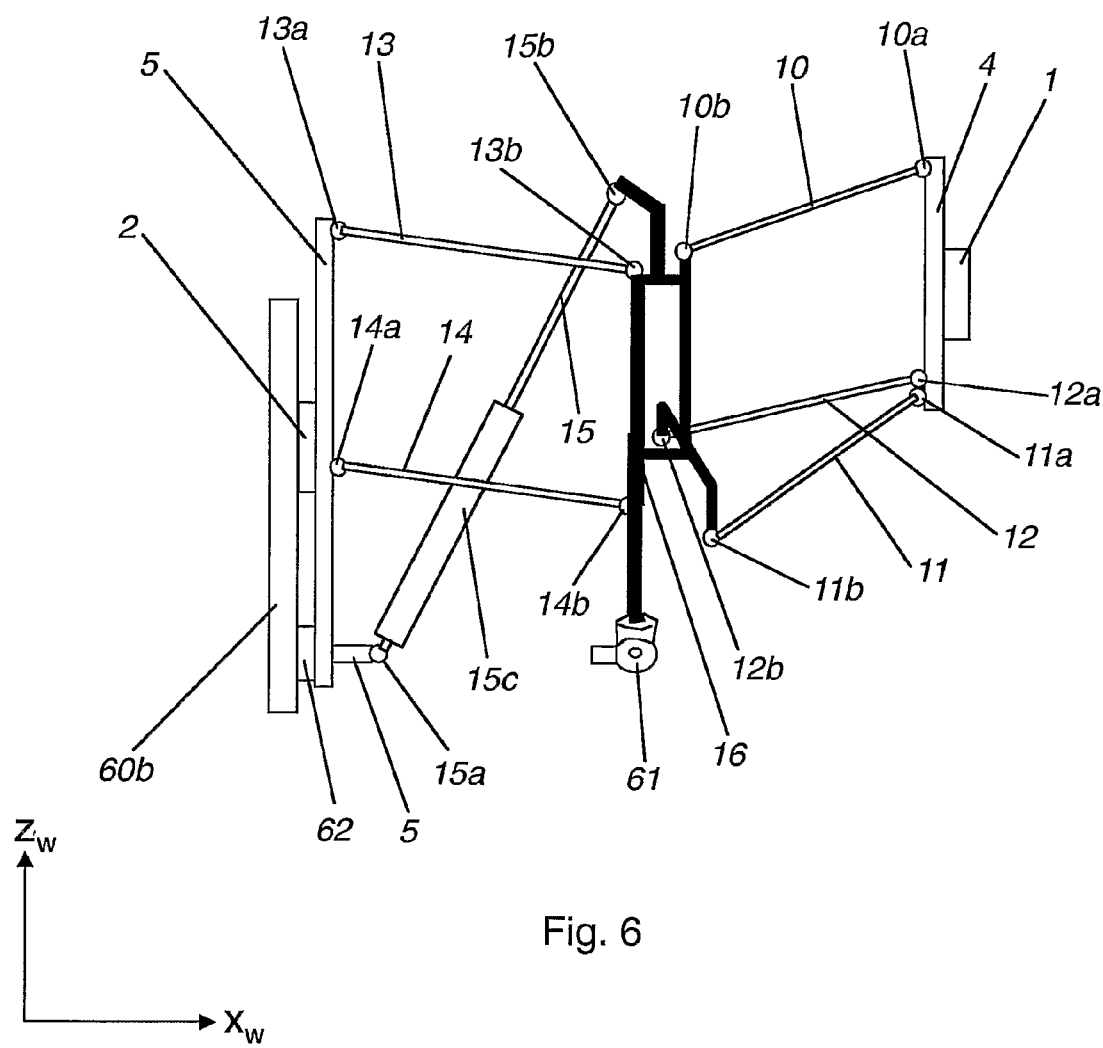

In FIG. 6 the linear actuation 6 for the third path 3 has been exchanged to a passive linear bearing arrangement 62, on which the second carriage 5 is mounted. Thus, the second carriage 5 now also moves the link 15 on the second path 2. To obtain a three DOF positioning of the moving platform 16, a linear actuator 15c for controlling the length of the link is integrated into the link 15. The mounting of link 15 on the second carriage 5 and on the moving platform 16 is made in such a way that the actuator 15c will have a distance to the links 13 and 14. The actuator 15c will now be responsible for the movement of the platform in the Zw direction.

Figure 7:
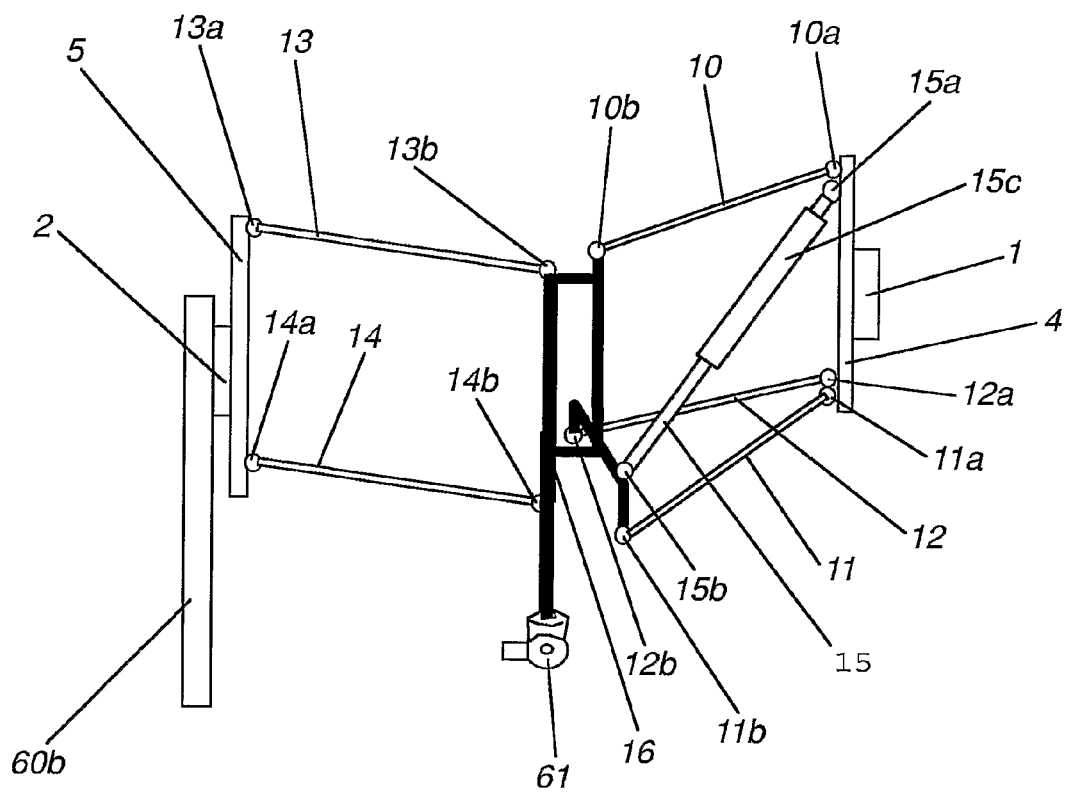

In FIG. 7 the actuated single link 15 has been moved to the first carriage 4 on the first path 1, the joint 15a is mounted below the joint 10a, and the joint 15b is mounted above the joint 11b. The actuator now works from above instead of from below as in FIG. 6. The manipulator has only two paths 1, 2 and the bearings for the mounting of the first carriage 4 on the first path 1 is made stiff enough to take care of the extra forces from the link 15. In total four links are mounted on the first carriage 4.

Figure 8:
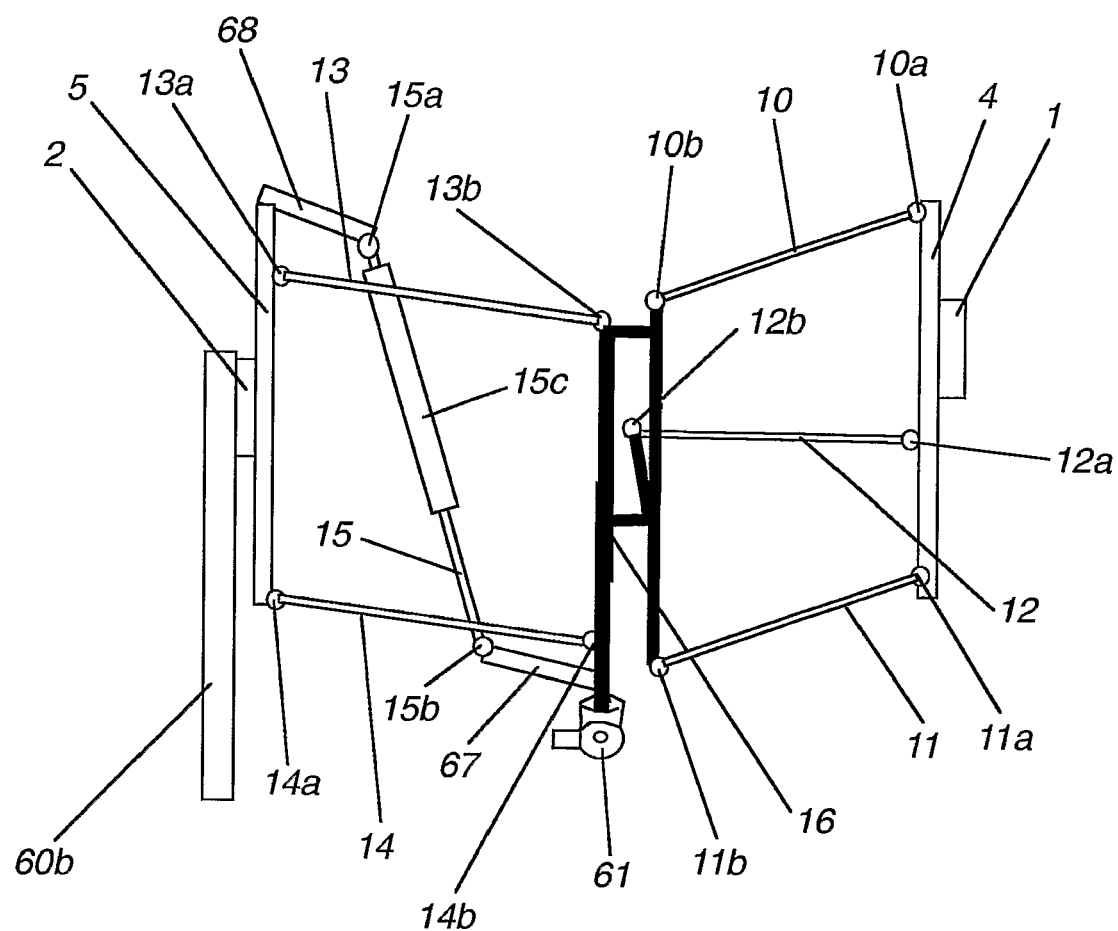

In FIG. 8 the linear actuator 15c has been integrated with the link 15 and to obtain a more vertical direction on the link 15 the joint 15a is mounted on an extension 68 on the second carriage 5 and the joint 15b is mounted on an extension 67 on the moving platform 16. The extensions 67, 58 are mounted in opposite directions and in such angles that the link 15 and the linear actuator 15c never collide with the links 13 and 14.

Figure 9:
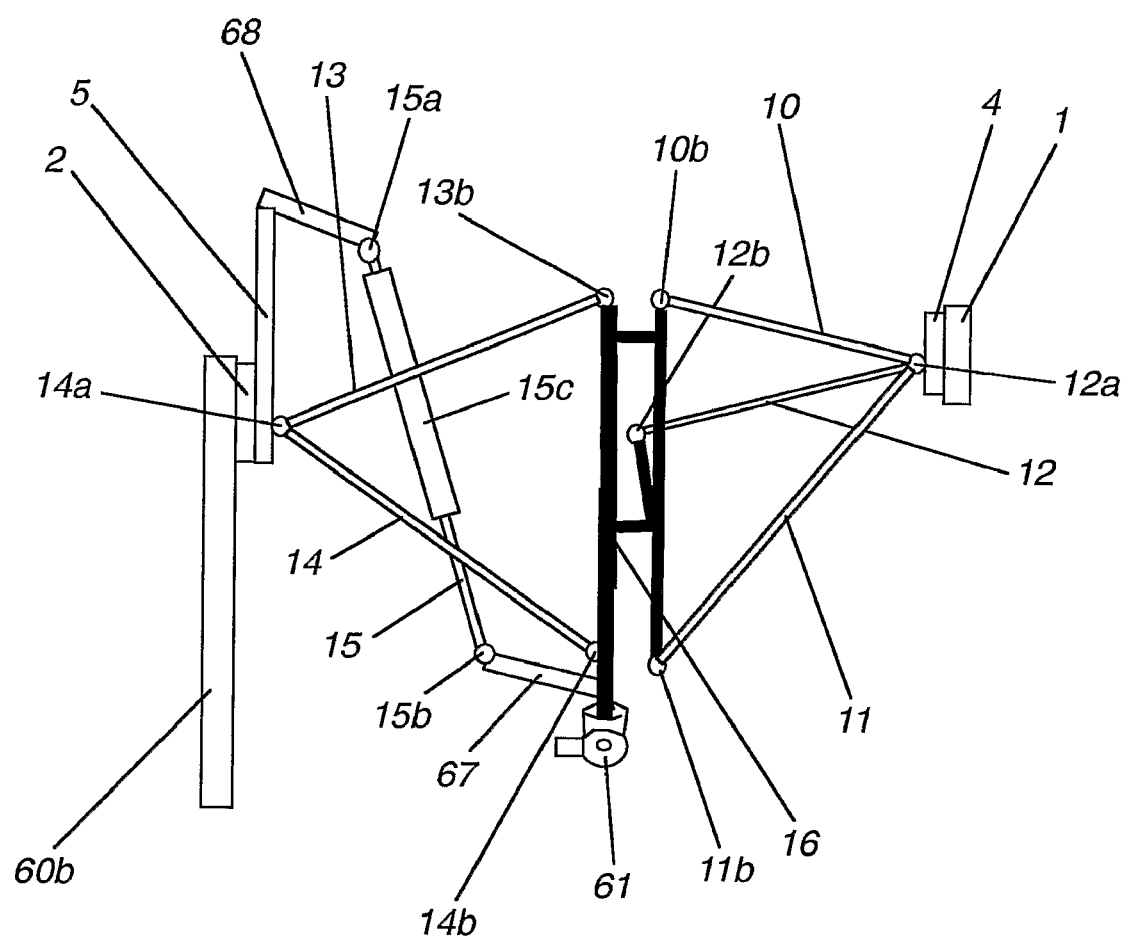

FIG. 9 shows a manipulator having common joints for links mounted on the same carriage. This can be used in for example the robot shown in FIG. 1. Then joints 10a, 11a and 12a (shown in FIG. 1) is mounted on a common joint 12a on the first carriage 4, and the joints 13a and 14a (shown in FIG. 1) is mounted on a common joint 14a on the second carriage 5. Observe that an advantage with this concept is that the first and second carriages 4 and 5 can be made much smaller. However, simultaneously the platform tilt angles will be dependent on the position of the platform.

Figure 10:
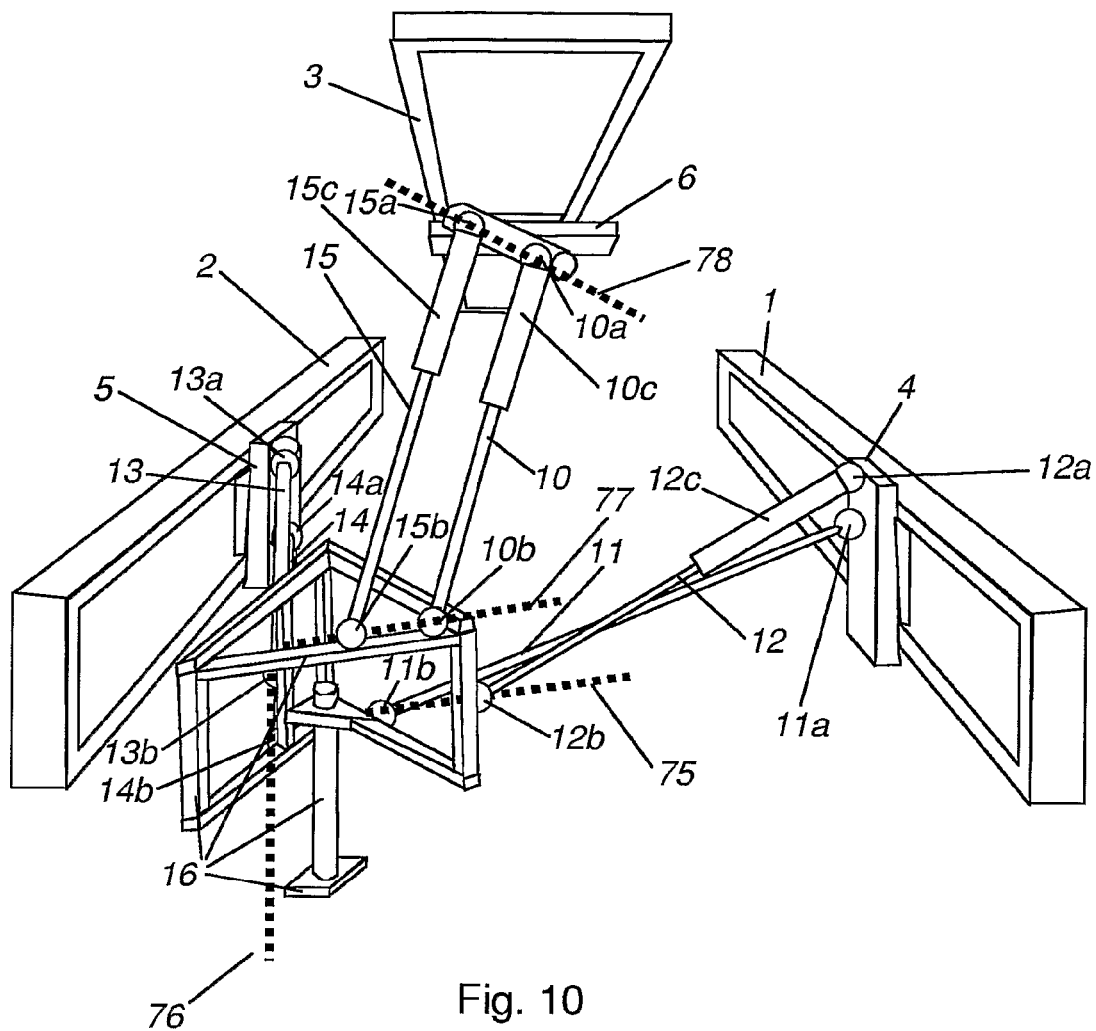
FIGS. 10-11 show two embodiments of an industrial robot having three arms with two links each.

FIG. 10 shows a link structure with the links 11 and 12 mounted on the first carriage 4, the links 13 and 14 mounted on second carriage 5 and the links 10 and 15 mounted on the third carriage 6. Thus, compared with the FIGS. 1, 4, 5 the link 10 has been moved from the first carriage 4 to the third carriage 6. In order to get this arrangement to work with only axial forces the six links has to take care of the three forces and three torque components acting on the moving platform 16. The links must be mounted in such a way that none of the lines 75, 76 and 77 are parallel to each other. Moreover one of the lines (77 in the figure) is not allowed to be perpendicular to any of the other lines (75 and 76 in the figure). The lines are defined by the kinematic centers of the joints of a pair of links connected to the same carriage. In the figure the integration of linear actuators in the link structure is exemplified with the linear actuator 10c for the link 10, the linear actuator 15c for the link 15, and the linear actuator 12c for the link 12. The line between the joints 15a and 10a is denoted 78.

By manipulating the actuators 10c and 15c synchronously the moving platform 16 will swing upwards/downwards and the actuation redundancy of carriage 6 can be used to have favorable angles between the three link pairs with respect to stiffness. If the actuators 10c and 15c are actuated asynchronously, this can be used to change the orientation of the platform and together with the actuator 12c the platform can be reoriented in two degrees of freedom.

Figure 11:
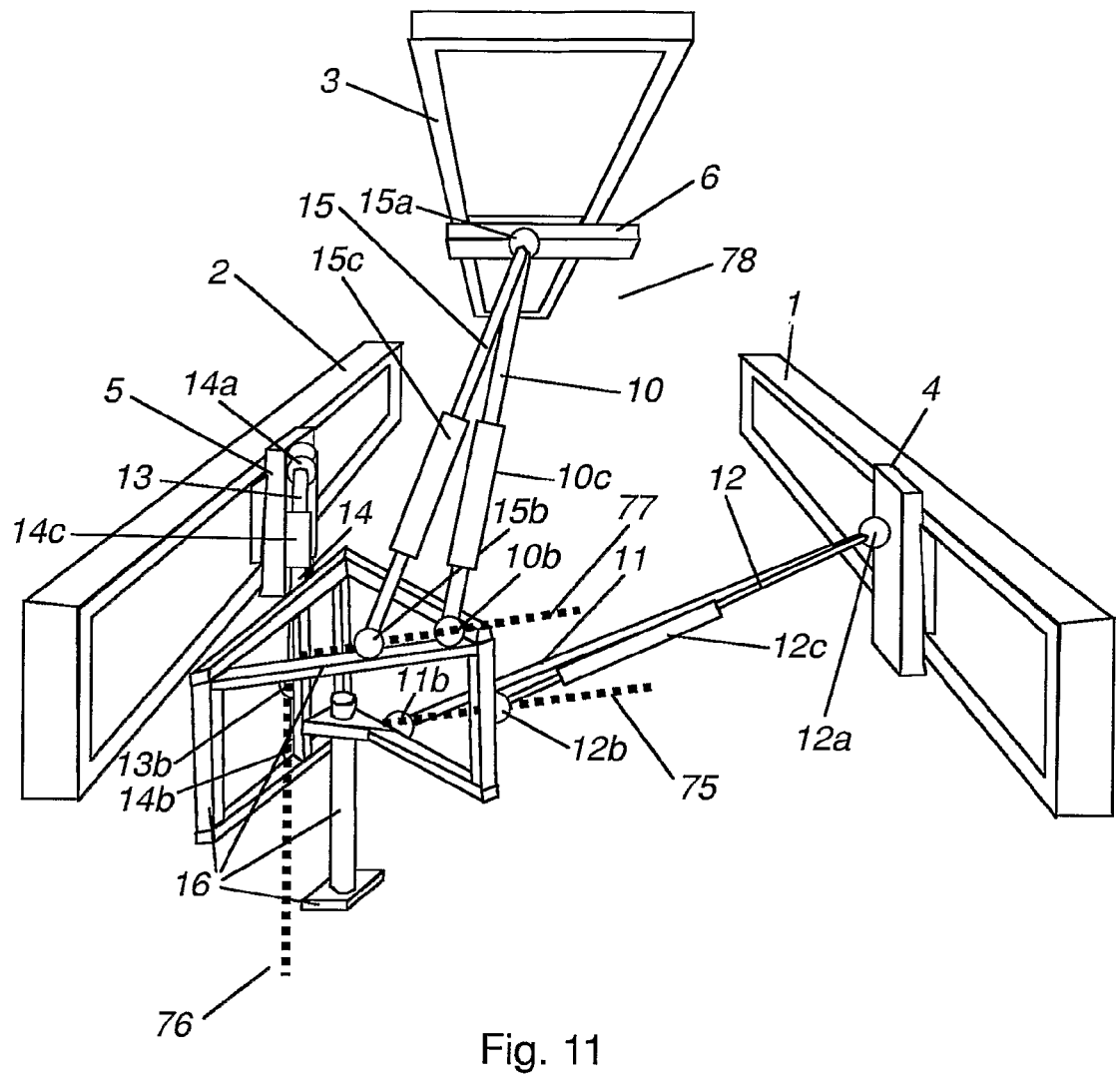

FIG. 11 is a variant of FIG. 10, in this case the links 15 and 10 are arranged to have a common joint 15a on the carriage 6 and link 15 includes the linear actuator 15c, and the link 10 includes the linear actuator 10c. In the same way the link pair 11/12 has a common joint 12a on the first carriage 4 and the link pair 13/14 has a common joint 14a on the second carriage 5. To obtain full six DOF manipulation of the platform one of the links in both link pair 11/12 and link pair 13/14 is mounted with a linear actuator for changing the length of the link, 12c for link 12 and 14c for link 14. Thus, the linear actuators 10c, 12c and 14c can be viewed upon as actuators for controlling the orientation of the platform, while the linear actuator 15c is used together with 10c to obtain a higher stiffness of the link structure.

Instead of integrating the linear actuator with the link 15, a separate linear actuator 63 is mounted on any of the carriages 4 and 5 to move the joint 15a of the single link 15 up and down. This is exemplified in FIG. 12.

Figure 12:
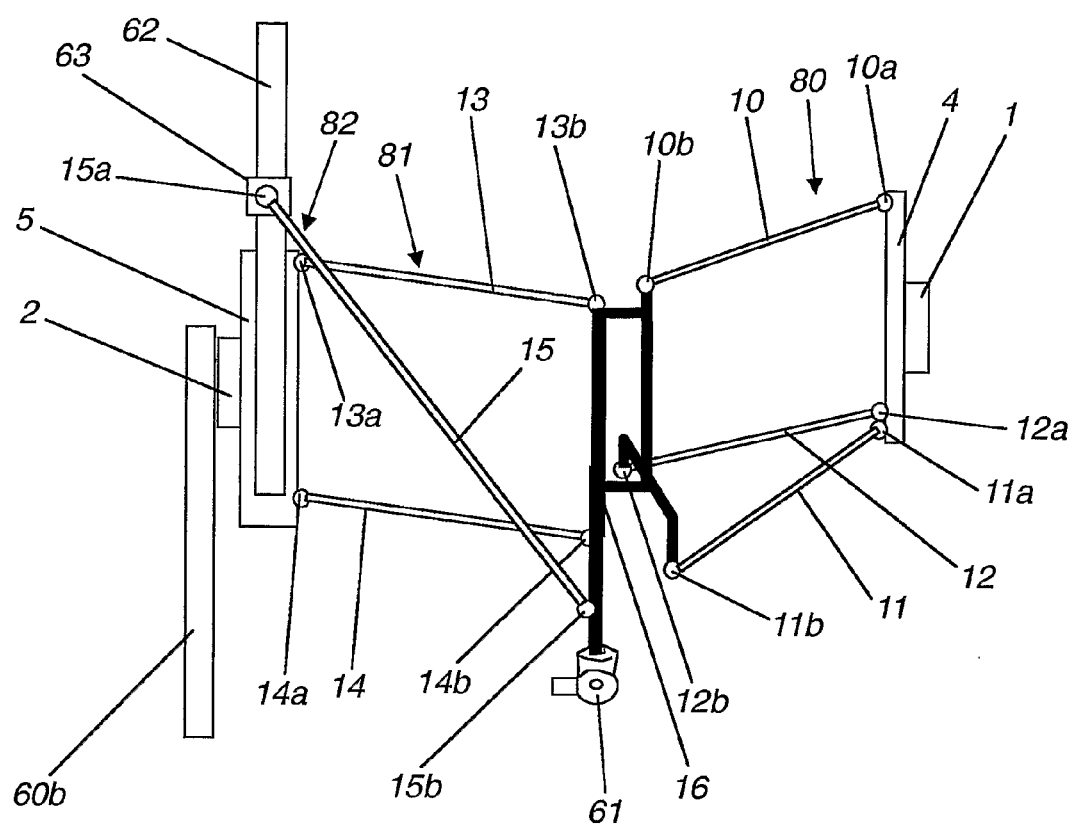
FIGS. 12-13 show two embodiment examples of an industrial robot having a separate linear actuator mounted on one of the first and second carriage to linearly move the outer joint of the link in relation to the carriage.

FIG. 12 shows an industrial robot for movement of an object in space having a platform 16 for carrying the object. The object is for example a tool. A first arm 80 is arranged for influencing the platform in a first movement, comprising a first linear path 1, a first carriage 4 linearly movable along the first path 1, and three links 10, 11, 12, each link comprising an outer joint 10b, 11b, 12b connected to the platform 16 and an inner joint 10a, 11a, 12a connected to the first carriage 4. A second arm 81 is arranged for influencing the platform 16 in a second movement, comprising a second linear path 2, a second carriage 5 linearly movable along the second path, and two links 13, 14, each link comprising an outer joint 13b, 14b connected to the platform 16 and an inner joint 13a, 14a connected to the second carriage 5. A third arm 82 is arranged for influencing the platform 16 in a third movement, comprising one link 15 comprising an outer joint 15b connected to the platform 16. The third arm 82 comprises a linear actuator 63 mounted on the second carriage 5, and the link 15 includes an inner joint 15a connected to the linear actuator 63, whereby the joint 15a, and consequently also the link 15 is linearly movable relative to the carriage 5.

The carriage 5 includes a vertically extending elongated beam 62. The elongated beam 62 is vertically mounted on the carriage 5. The linear actuator 63 comprises a carriage, which is linearly movable along the beam 62. The joint 15a is connected to the actuator 63, which is controlled to move the joint 15a. This movement is transmitted to the moving platform 16 by the link 15 and the joint 15b. The advantage of this arrangement is that the linear actuator does not add any inertia to the link structure. On the other hand the linear beam will need to be longer than the integrated actuator 15c, and needs to be stiff also with respect to bending, not only to axial forces as the integrated actuator 15c. Therefore the solution in FIG. 12 will be used when high speed and acceleration is most important and the integrated actuator solution as in the earlier figures when high stiffness is more important than high speed and acceleration.

Figure 13:
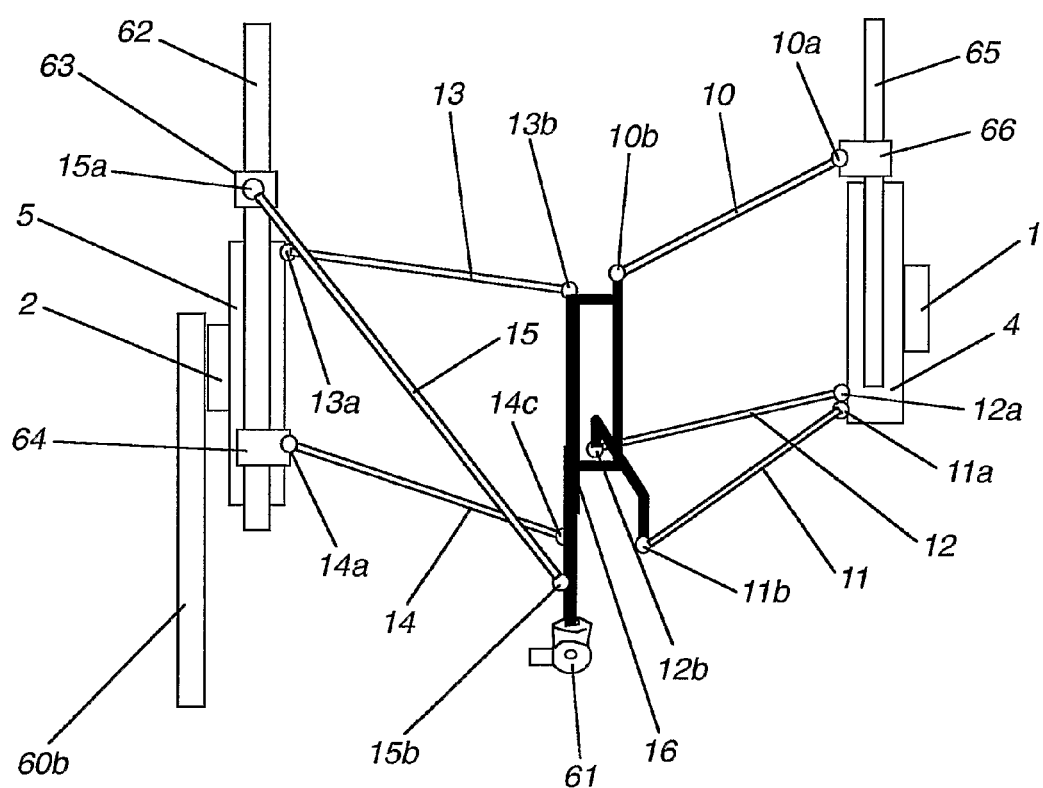

In FIG. 13 the vertical beam 62 with the linearly movable actuator 63 also includes a second carriage 64 moving the joint 14a of the link 14. In a similar manner the joint 10a is moved by a carriage 66 on a elongated beam 65 mounted on the first carriage 4. Moving the carriages 64 and 66 up and down will change the distance between joints 14a and 13a and between the joints 10a and 12a/11a, which will tilt the moving platform 16. Thus, the actuated carriages 64 and 65 have the same purpose as the integrated linear actuators 13c and 10c in FIG. 1 to control the tilt angles of the platform 16.

As mentioned in connection with FIG. 12 this arrangement is advantageous when low link structure mass is needed.

In FIG. 13 the joint 13a is mounted directly on the carriage 5 but of course the joint 13a could be mounted on the carriage 64 and in that case the joint 14a could be mounted on the carriage 5. In the same way it is possible to mount the joints 11a and 11b on the carriage 66 instead of on the first carriage 4, and in that case the joint 10a is mounted on the carriage 4 instead of on carriage 66.

Figure 14:
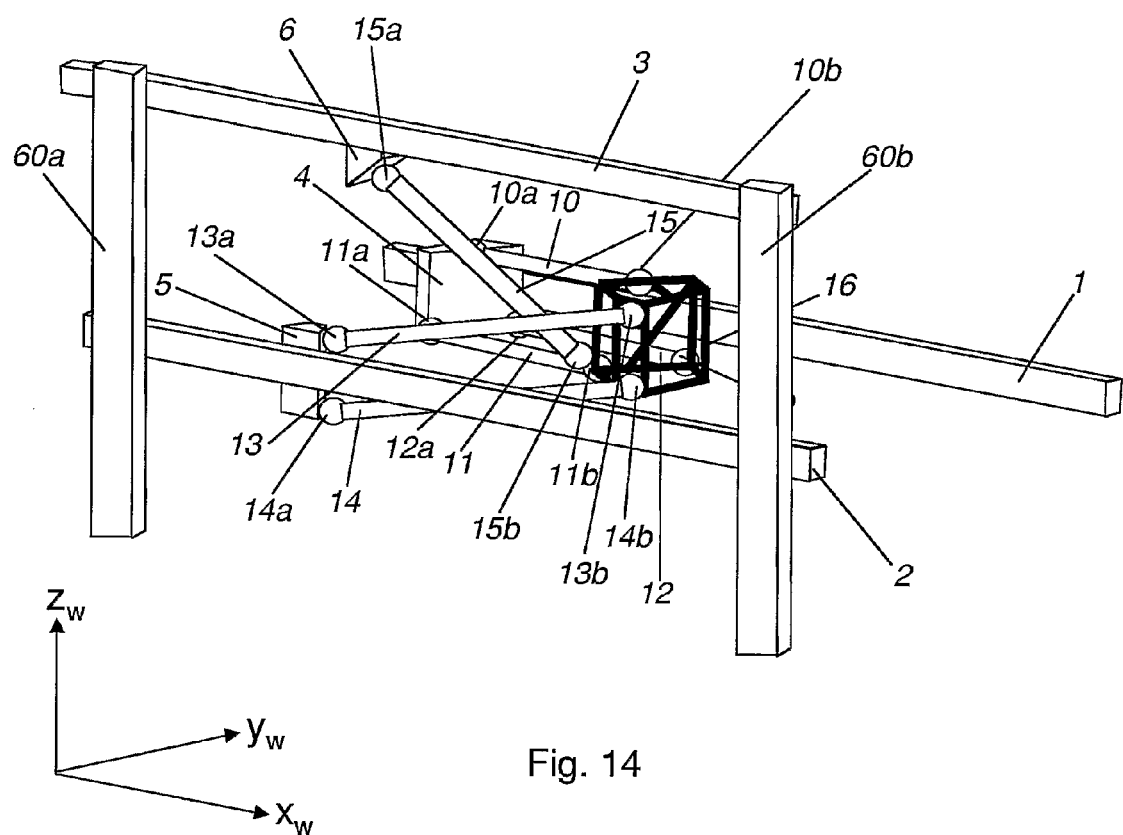
FIGS. 14-16 show different embodiments of a parallel kinematic manipulator.

The paths 1, 2, 3 in FIGS. 1, 4, 5, 10 are arranged in such a way that they form a triangle with the third path 3 in between the paths 1 and 2. FIG. 14 shows that this is not necessary, instead is the third path 3 here mounted above path 2, which makes it easier to build a framework 60a and 60b on which the linear paths are mounted. The link structure in this figure is the same as in FIG. 1 and linear actuators can be integrated into the link structure as described in FIG. 1.

Figure 15:
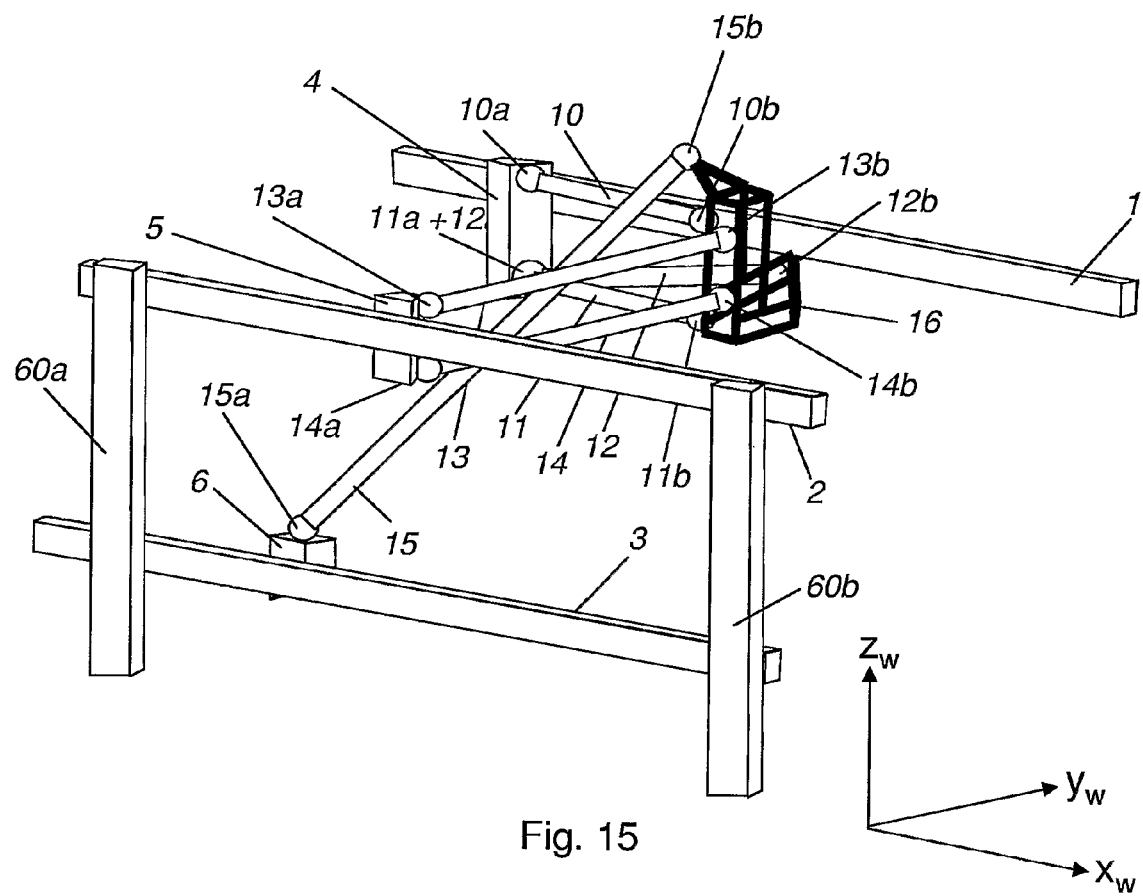

FIG. 15 shows an alternative link assembly where the second path 2 is mounted above the third path 3 instead of below as in FIG. 5. This arrangement is used when the robot has to work higher, for example when the work object is on a rotating table or on a transfer line. The framework for holding up the first linear path 1 is not shown in any of the FIG. 14 or 15, but it must of course be higher in FIG. 15 than in FIG. 14.

Figure 16:
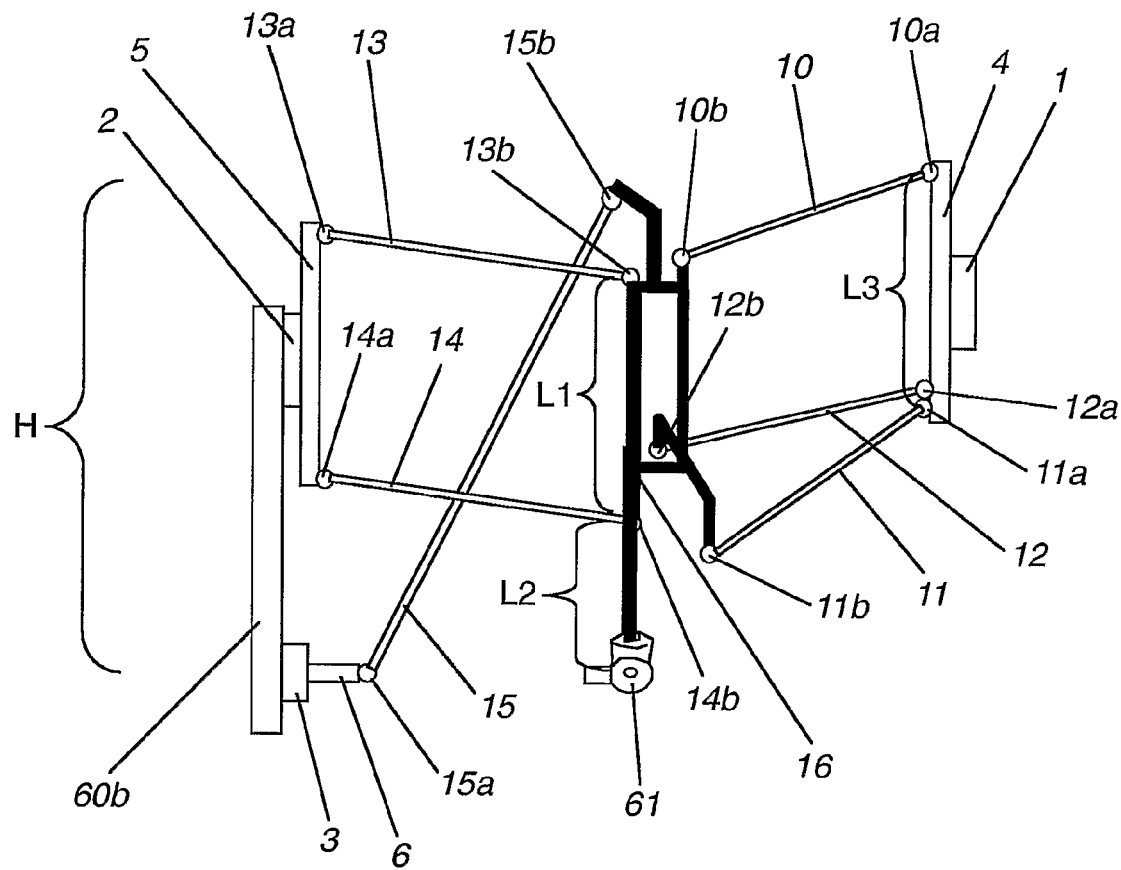

FIG. 16 shows the robot arrangement in FIG. 15 in the Xw-direction. In FIG. 16 the wrist 61 is included with an offset L2 from the joint 14b. On the wrist there will be forces and torques and the longer L2 is the bigger forces will be in the links 10-14 as a result of horizontal forces. In order to obtain as small forces as possible in the links 10-14 under these circumstances it is important to design the robot in such a way that the distances L1, L3 and L4 are as big as possible in relation to the length L2. Simultaneously in is of course important not to obtain a too high manipulator, which means that one has to follow a constraint on the parameter H in the figure. Of course, linear actuators can also be integrated into the links in this kind.

Figure 17:
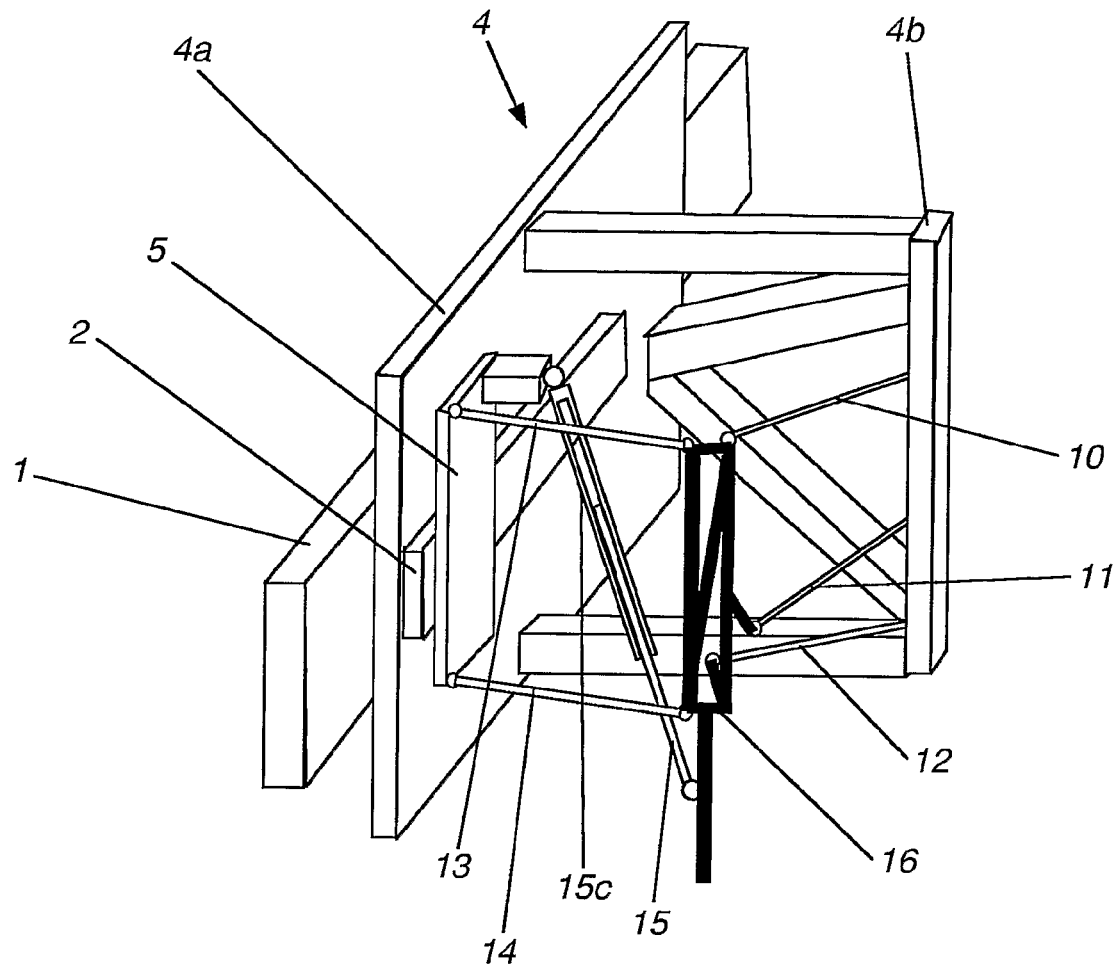
FIG. 17 shows an example of an industrial robot useful for processing very long objects.

FIG. 17 shows an example of an industrial robot useful for processing long objects. In cases where the work object is very long, as for example for airplane wings, wind power blades, steel beams etc. it may be too expensive to use two parallel linear actuators 1 and 2 for the whole length of the object. One possibility is then to make a mounting of the actuating part of the robot as shown in FIG. 17. The linear path 1 will have the same length as the work object and the carriage 4, actuated to move along the first linear path 1, comprises two parts 4a and 4b. The second linear path 2 is mounted with its carriage 5 on the part 4a, and the links 10-12 are directly mounted on the part 4b. The link 15 of the third arm is arranged with an adjustable length and includes a linear actuator 15c for controlling the length of the link 15. The link 15 has an inner joint connected to the second carriage 5 and an outer joint connected to the platform 16. The links 13, 14 of the second arm and the link 15 with the linear actuator 15c are mounted on the carriage 5. The inner joints of the two links 13,14 are connected to the second carriage 5 and the outer joints of the two links 13,14 are connected to the platform. Thus, by this, both the linear working ranges of the second path 2 and the actuator 15c will be small and only the working range of path 1 need to cover the length of the work object.

The invention claimed is:
1. An industrial robot for movement of an object in space, the industrial robot comprising:
a platform arranged for carrying the object,
a first arm arranged for influencing the platform in a first movement, comprising a first actuator and three links, each link having an outer joint connected to the platform and an inner joint connected to the first actuator, a second arm arranged for influencing the platform in a second movement, comprising a second actuator and two links, each link having an outer joint connected to the platform and an inner joint connected to the second actuator, a third arm arranged for influencing the platform in a third movement, comprising a third actuator and one link having an outer joint connected to the platform, wherein at least one of said links is arranged with an adjustable length and includes a linear actuator for controlling the length of the link, wherein said link of the third arm is said link arranged with an adjustable length and includes said linear actuator for controlling the length of the link and the length of the link with the adjustable length is configured together with the position of the third actuator to minimize a deviation from 90 degrees between the link of the third arm and the links of the first and second arm.

2. The industrial robot according to claim 1, wherein said link of the third arm is said link arranged with an adjustable length and includes said linear actuator for controlling the length of the link.

3. The industrial robot according to claim 2, wherein said first actuator comprises a first path and a first carriage linearly movable along the first path, and said inner joints of said three links are connected to the first carriage, said second actuator comprises a second path and a second carriage linearly movable along the second path, and said inner joints of said two links are connected to the second carriage, and said third arm comprises a third actuator having a third path and a third carriage linearly movable along the third path, and said link of the third arm comprises an inner joint connected to the third carriage.

4. The industrial robot according to claim 2, wherein said first actuator comprises a first path and a first carriage linearly movable along the first path, and said inner joints of said three links are connected to the first carriage, said second actuator comprises a second path and a second carriage linearly movable along the second path, and said inner joints of said two links are connected to the second carriage, the second path is mounted on the first carriage, and said link of the third arm comprises an inner joint connected to the second carriage.

5. The industrial robot according to claim 2, wherein at least one of said first and second actuators comprises a path and a carriage linearly movable along the path, and said link of the third arm comprises an inner joint connected to another carriage.

6. The industrial robot according to claim 1, wherein at least two of said links are arranged with adjustable lengths and include linear actuators for controlling the length of the links.

7. The industrial robot according to claim 1, wherein at least one of said three links of the first arm is arranged with an adjustable length and includes a linear actuator for controlling the length of the link.

8. The industrial robot according to claim 1, wherein at least one of said two links of the second arm is arranged with an adjustable length and includes a linear actuator for controlling the length of the link.

9. A method for controlling an industrial robot for movement of an object in space comprising a platform arranged for carrying the object, a first arm arranged for influencing the platform in a first movement, comprising a first actuator and three links, each link having an outer joint connected to the platform and an inner joint connected to the first actuator, a second arm arranged for influencing the platform in a second movement, comprising a second actuator and two links, each link having an outer joint connected to the platform and an inner joint connected to the second actuator, and a third arm arranged for influencing the platform in a third movement, comprising a third actuator having a third path and a third carriage linearly movable along the third path, one link having an outer joint connected to the platform and an inner joint connected to the third carriage, and said one link is arranged with an adjustable length and includes a linear actuator for controlling the length of the link, wherein said link of the third arm is said link arranged with an adjustable length and includes said linear actuator for controlling the length of the link, the method comprising:

controlling the movement of the third carriage along the third path thereby controlling the inclination of said link of the third arm in order to increase the stiffness of the robot with respect to tool forces, determining a deviation from 90 degrees between the link of the third arm and the links of the first and second arm; and adjusting the length of the link based and the position of the third carriage to obtain the desired position of the platform with the smallest deviation from 90 degrees between the link of the third arm and the links of the first and second arm.

10. The method according to claim 9, further comprising:
determining an angle between the link of the third arm and at least one of the other links of the robot, and on basis of the determined angle controlling the movement of third carriage along the third path in order to obtain a desired angle, which is favorable with regard to the stiffness of the robot, between the link of the third arm and the other link.

11. The method according to claim 10, wherein said desired angle is 90°.

12. The method according to claim 9, further comprising:
determining an angle between the link of the third arm and the third path, and on basis of the determined angle controlling the movement of the third carriage along the third path in order to obtain a desired angle, which is favorable with regard to the stiffness of the robot, between the link of the third arm and the third path.

13. A computer program product, comprising:
a computer readable medium; and computer program instructions recorded on the medium and executable by a processor for performing a method for controlling an industrial robot comprising a platform arranged for carrying the object, a first arm arranged for influencing the platform in a first movement, comprising a first actuator and three links, each link having an outer joint connected to the platform and an inner joint connected to the first actuator, a second arm arranged for influencing the platform in a second movement, comprising a second actuator and two links, each link having an outer joint connected to the platform and an inner joint connected to the second actuator, and a third arm arranged for influencing the platform in a third movement, comprising a third actuator having a third path and a third carriage linearly movable along the third path, one link having an outer joint connected to the platform and an inner joint connected to the third carriage, and said one link is arranged with an adjustable length and includes a linear actuator for controlling the length of the link, wherein said link of the third arm is said link arranged with an adjustable length and includes said linear actuator for controlling the length of the link, the method comprising controlling the movement of the third carriage along the third path thereby controlling the inclination of said link of the third arm in order to increase the stiffness of the robot with respect to tool forces, determining a deviation from 90 degrees between the link of the third arm and the links of the links of the first and second arm; and adjusting the length of the link and the position of the third carriage to obtain the desired position of the platform with the smallest deviation from 90 degrees between the link of the third arm and the links of the first and second arm.

14. An industrial robot for movement of an object in space, the industrial robot comprising:
- a platform arranged for carrying the object,
- a first arm arranged for influencing the platform in a first movement, comprising a first path and a first carriage linearly movable along the first path, and three links, each link comprising an outer joint connected to the platform and an inner joint connected to the first carriage,
- a second arm arranged for influencing the platform in a second movement, comprising a second path and a second carriage linearly movable along the second path, and two links each link comprising an outer joint connected to the platform and an inner joint connected to the second carriage, and
- a third arm arranged for influencing the platform in a third movement, comprising a third actuator one link having an outer joint connected to the platform and an inner joint, a linear actuator connected to one of said first and second carriage and to said inner joint of the link of the third arm, wherein the linear actuator is adapted to linearly move the link of the third arm relative to the connected carriage, wherein said link of the third arm is said link arranged with an arranged adjustable length and includes said linear actuator for controlling the length of the link and the length of the link with the adjustable length is configured together with the position of the third actuator to minimize a deviations from 90 degrees between the link of the third arm and the links of the first and second arm.

15. A method for controlling an industrial robot for movement of an object in space comprising a platform arranged for carrying the object, a first arm arranged for influencing the platform in a first movement, comprising a first actuator and three links, each link having an outer joint connected to the platform and an inner joint connected to the first actuator, a second arm arranged for influencing the platform in a second movement, comprising a second actuator and two links, each link having an outer joint connected to the platform and an inner joint connected to the second actuator, and a third arm arranged for influencing the platform in a third movement, comprising a third actuator having a third path and a third carriage linearly movable along the third path, one link having an outer joint connected to the platform and an inner joint connected to the third carriage, and said one link is arranged with an adjustable length and includes a linear actuator for controlling the length of the link, wherein said link of the third arm is said link arranged with an adjustable length and includes said linear actuator for controlling the length of the link, the method comprising:
- controlling the movement of the third carriage along the third path thereby controlling the inclination of said link of the third arm in order to increase the stiffness of the robot with respect to tool forces,
- determining a deviation from 90 degrees between the link of the third arm and the third path; and
- adjusting the length of the link and the position of the third carriage to obtain the desired position of the platform with the smallest deviation from 90 degrees between the link of the third arm and the third path.

16. A computer program product, comprising:
- a computer readable medium; and
- computer program instructions recorded on the medium and executable by a processor for performing a method for controlling an industrial robot for movement of an object in space comprising a platform arranged for carrying the object, a first arm arranged for influencing the platform in a first movement, comprising a first actuator and three links, each link having an outer joint connected to the platform and an inner joint connected to the first actuator, a second arm arranged for influencing the platform in a second movement, comprising a second actuator and two links, each link having an outer joint connected to the platform and an inner joint connected to the second actuator, and a third arm arranged for influencing the platform in a third movement, comprising a third actuator having a third path and a third carriage linearly movable along the third path, one link having an outer joint connected to the platform and an inner joint connected to the third carriage, and said one link is arranged with an adjustable length and includes a linear actuator for controlling the length of the link, wherein said link of the third arm is said link arranged with an adjustable length and includes said linear actuator for controlling the length of the link, the method comprising:
- controlling the movement of the third carriage along the third path thereby controlling the inclination of said link of the third arm in order to increase the stiffness of the robot with respect to tool forces,
- determining a deviation from 90 degrees between the link of the third arm and the third path; and
- adjusting the length of the link and the position of the third carriage to obtain the desired position of the platform with the smallest deviation from 90 degrees between the link of the third arm and the third path.

17. An industrial robot for movement of an object in space, the industrial robot comprising:
- a platform arranged for carrying the object,
- a first arm arranged for influencing the platform in a first movement, comprising a first actuator and three links, each link having an outer joint connected to the platform and an inner joint connected to the first actuator,
- a second arm arranged for influencing the platform in a second movement, comprising a second actuator and two links, each link having an outer joint connected to the platform and an inner joint connected to the second actuator,
- a third arm arranged for influencing the platform in a third movement, comprising a third actuator and one link having an outer joint connected to the platform, wherein at least one of said links is arranged with an adjustable length and includes a linear actuator for controlling the length of the link, wherein said link of the third arm is said link arranged with an adjustable length and includes said linear actuator for controlling the length of the link and the length of the link with the adjustable length is configured together with the position of the third carriage to obtain the desired position of the platform with the smallest deviation from 90 degrees between the link of the third arm and the third path.

* * * * *